(12) United States Patent
Sakurai et al.

(10) Patent No.: US 11,639,313 B2
(45) Date of Patent: May 2, 2023

(54) DIELECTRIC CERAMIC COMPOSITION AND ELECTRONIC COMPONENT

(71) Applicant: TDK CORPORATION, Tokyo (JP)

(72) Inventors: Dan Sakurai, Tokyo (JP); Yasuhiro Ito, Tokyo (JP); Nobuto Morigasaki, Tokyo (JP); Toshihiko Kaneko, Tokyo (JP); Toshihiro Iguchi, Tokyo (JP)

(73) Assignee: TDK CORPORATION, Tokyo (JP)

(*) Notice: Subject to any disclaimer, the term of this patent is extended or adjusted under 35 U.S.C. 154(b) by 7 days.

(21) Appl. No.: 17/551,633

(22) Filed: Dec. 15, 2021

(65) Prior Publication Data

US 2022/0194859 A1    Jun. 23, 2022

(30) Foreign Application Priority Data

Dec. 21, 2020 (JP) .............................. JP2020-211754

(51) Int. Cl.
*C04B 35/47* (2006.01)
*H01B 3/12* (2006.01)

(52) U.S. Cl.
CPC .............. *C04B 35/47* (2013.01); *H01B 3/12* (2013.01)

(58) Field of Classification Search
CPC ............ C04B 35/47; C04B 2235/3208; C04B 2235/3213; C04B 2235/3215; C04B 2235/3217; C04B 2235/3248; C04B 2235/3249; C04B 2235/3262; C04B 2235/3418; C04B 2235/85; C04B 2235/3232; C04B 35/4682; C04B 35/486; C04B 35/49; H01B 3/12; H01G 4/1227; H01G 4/1236; H01G 4/1245
See application file for complete search history.

(56) References Cited

U.S. PATENT DOCUMENTS

| 2009/0246541 A1 | 10/2009 | Nonaka et al. |
| 2016/0118188 A1 | 4/2016 | Wada |
| 2017/0287635 A1* | 10/2017 | Sakurai ................. H01G 4/012 |

FOREIGN PATENT DOCUMENTS

| CN | 105377793 A | 3/2016 |
| CN | 107266063 A | 10/2017 |
| JP | 4561922 B2 | 10/2010 |

* cited by examiner

*Primary Examiner* — Karl E Group
*Assistant Examiner* — Cameron K Miller
(74) *Attorney, Agent, or Firm* — Oliff PLC

(57) ABSTRACT

A dielectric ceramic composition contains dielectric particles containing a main component represented by a composition formula $(Ba_{1-x-y}Sr_xCa_y)_m(Ti_{1-z}Zr_z)O_3$ and grain boundaries present between the dielectric particles. The values of m, x, y, and z in the composition formula are all molar ratios. In the composition formula, $0.9 \leq m \leq 1.4$, $0 \leq x < 1.0$, $0 < y \leq 1.0$, $0.9 \leq (x+y) \leq 1.0$, and $0.9 \leq z \leq 1.0$ are satisfied. The dielectric particles contain specific structural particles having a predetermined intragranular structure, and each of the specific structural particles intragranularly includes a first region and a second region having different Ca concentrations from each other. C2/C1 is less than 0.8 in which C1 is an average value of the Ca concentration in the first region and C2 is an average value of the Ca concentration in the second region.

10 Claims, 6 Drawing Sheets

DIELECTRIC CERAMIC COMPOSITION AND ELECTRONIC COMPONENT

TECHNICAL FIELD

The present disclosure relates to a dielectric ceramic composition and an electronic component containing the dielectric ceramic composition.

BACKGROUND

A paraelectric material having a smaller capacitance variation with temperature change than a ferroelectric material such as barium titanate is commonly used as a dielectric ceramic composition in electronic components (e.g., ceramic capacitors, filters) for temperature compensation and high-frequency circuits. Attempts have been made to optimize the main component composition of this paraelectric material and a blending ratio of subcomponents to be added to this paraelectric material in order to improve temperature characteristics.

For example, Japanese Patent No. 4561922 (Patent Document 1) discloses an invention relating to a calcium strontium zirconate-based ((Ca,Sr)ZrO$_3$) paraelectric material. Specifically, in the invention of Patent Literature 1, the sinterability of the above paraelectric material is improved by preparing a main component composition and adding a predetermined amount of Al$_2$O$_3$ and SiO$_2$ as subcomponents after substituting Mn for a part of B site (Zr). Accordingly, the paraelectric material of Patent Document 1 can achieve excellent temperature characteristics even when applied to a thin multilayer ceramic capacitor.

In recent years, electronic components using paraelectric materials are required to have not only excellent temperature characteristics but also excellent insulation characteristics. However, improving the temperature characteristics by optimizing a composition ratio may impair the insulation characteristics as shown in Patent Document 1. In other word, it is extremely difficult to achieve both excellent temperature characteristics and insulation characteristics at the same time. Therefore, there is a need to develop a dielectric ceramic composition capable of improving both the temperature characteristics and the insulation characteristics.
[Patent Document 1] JP 4561922 B2

BRIEF SUMMARY OF THE DISCLOSURE

The present disclosure is achieved in view of such circumstances, and an object of the present disclosure is to provide a dielectric ceramic composition having a small temperature coefficient of capacitance and a high insulation resistance, and an electronic component containing the dielectric ceramic composition.

In order to achieve the above object, a dielectric ceramic composition according to the present invention includes:

dielectric particles containing a main component represented by a composition formula $(Ba_{1-x-y}Sr_xCa_y)_m(Ti_{1-z}Zr_z)O_3$; and grain boundaries present between the dielectric particles, in which m, x, y, and z in the composition formula are all molar ratios, $0.9 \leq m \leq 1.4$, $0 \leq x < 1.0$, $0 < y \leq 1.0$, $0.9 \leq (x+y) \leq 1.0$, and $0.9 \leq z \leq 1.0$ are satisfied in the composition formula, the dielectric particles contain specific structural particles having a predetermined intragranular structure, and each of the specific structural particles intragranularly includes a first region and a second region having different Ca concentrations from each other, and C2/C1 is less than 0.8 in which C1 is an average value of the Ca concentration in the first region and C2 is an average value of the Ca concentration in the second region.

When the dielectric ceramic composition according to the present invention has the above characteristics, a low temperature coefficient of capacitance and a high insulation resistance can be achieved, and both temperature characteristics and insulation characteristics can be improved at the same time.

In the above dielectric ceramic composition, preferably, the second region includes a particle center of the specific structural particle, and the first region surrounds the second region. In addition, C2/C1 is preferably less than 0.7, and more preferably less than 0.5. The smaller the Ca average concentration in the second region side is with respect to the Ca average concentration in the first region, the higher the insulation resistance becomes.

In a cross section of the dielectric ceramic composition, when an area occupied by the first region is defined as A1, an area occupied by the second region is defined as A2, and a sum of A1 and A2 is defined as A0, preferably $0.05 < A2/A0 < 0.6$ is satisfied, more preferably $0.05 < A2/A0 < 0.4$ is satisfied, and still more preferably $0.1 < A2/A0 < 0.4$ is satisfied.

When the dielectric ceramic composition satisfies the above conditions, the temperature characteristics and the insulation characteristics can be further improved.

The number ratio of the specific structural particles to the dielectric particles is preferably 50% or more, and more preferably 80% or more. Including the specific structural particles having two regions with different Ca concentrations to the extent of the above ratios enables the temperature coefficient of capacitance to be smaller and the insulation resistance to be higher.

The above dielectric ceramic composition according to the present disclosure can be suitably used for electronic components, such as a ceramic capacitor, a filter, and a varistor, and is particularly suitable for electronic components capable of supporting COG characteristics.

BRIEF DESCRIPTION OF THE DRAWING(S)

DETAILED DESCRIPTION OF THE DISCLOSURE

Figure 1:
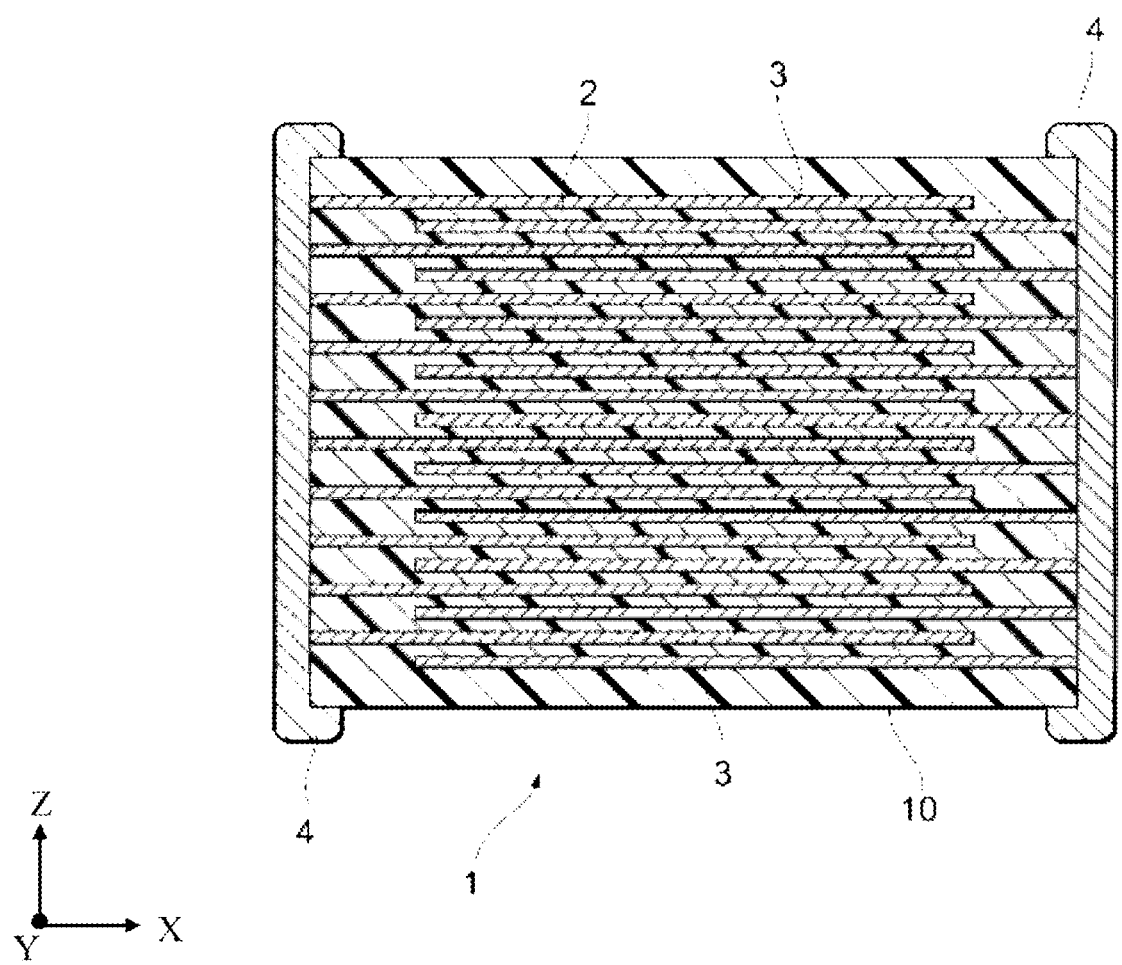
FIG. 1 is a cross-sectional view of a multilayer ceramic capacitor according to an embodiment of the present invention.

The present disclosure will be described below in detail based on an embodiment illustrated in the drawings.

In the present embodiment, a multilayer ceramic capacitor 1 illustrated in FIG. 1 is described as an example of an electronic component according to the present disclosure. The multilayer ceramic capacitor 1 includes an element body 10 and a pair of external electrodes 4 formed on both ends of the element body 10. The element body 10 has a structure in which dielectric layers 2 and internal electrode layers 3 are alternately laminated along the Z-axis direction. The element body 10 may have any shape, and usually has a rectangular parallelepiped shape. In addition, the dimensions of the element body 10 are not limited and are appropriately determined based on usage.

Each of the dielectric layers 2 contains a dielectric ceramic composition 20 according to the present embodiment, which will be described later. An average thickness (layer thickness) of the dielectric layers 2 is not limited, and can be optionally determined according to desired characteristics, usage, and the like. For example, the average thickness (layer thickness) of the dielectric layers 2 is preferably 30 μm or less, more preferably 5 μm or less, and still more preferably 2 μm or less. In addition, the number of layers of the dielectric layers 2 is not limited, and can be optionally determined according to desired characteristics and usage. For example, the number of the layers is preferably 20 or more, and more preferably 50 or more.

Meanwhile, the internal electrode layers 3 are laminated between the dielectric layers 2, and the number of layers of the internal electrode layers is determined according to the number of the layers of the dielectric layers 2. In addition, a thickness of the internal electrode layers 3 is not limited, and is preferably, for example, 5 μm or less, and more preferably 2 μm or less.

Further, the internal electrode layers 3 are laminated so that their ends are alternately exposed to one of the two end surfaces of the element body 10 facing each other in the X-axis direction. The pair of external electrodes 4 are formed at both ends of the element body 10 in the X-axis direction, and are electrically connected to the exposed ends of the alternately arranged internal electrode layers 3. By forming the internal electrode layers 3 and the external electrodes 4 in this way, the external electrodes 4 and the internal electrode layers 3 form a capacitor circuit.

That is, the internal electrode layers 3 function as a part of the capacitor circuit to apply a voltage to each dielectric layer 2. Therefore, each of the internal electrode layers 3 contains a conductive material, and the type of the conductive material is not limited. In the present embodiment, a constituent material of the dielectric layer 2 has resistance to reduction, and thus a base metal material can be used as the conductive material. Among the base metal material, it is preferable to use Ni or a Ni-based alloy. When the internal electrode layer 3 contains the Ni-based alloy as the main component, a Ni content in this alloy is preferably, for example, 95 wt % or more, and preferably contains one or more kinds of elements selected from Mn, Cu, Cr, and the like. In addition to the above conductive material, the internal electrode layer 3 may contain, as a co-material, a ceramic component contained in the dielectric layer 2, and a non-metal component, such as S or P, may be contained in an amount of about 0.1 wt % or less.

It is only required that a conductive material is contained in the external electrode 4, and the material and thickness of the conductive material in the external electrode 4 are not limited. For example, the external electrode 4 can be a baking electrode of a conductive paste, a resin electrode containing a thermosetting resin, an electrode formed by plating, an electrode formed by sputtering, or a laminated electrode in which a plurality of the above electrodes is laminated. In addition, the conductive material contained in the external electrode 4 is not limited as long as the conductive material has electrical conductivity. For example, Ni, Cu, Sn, Ag, Pd, Pt, Au, or an alloy containing at least one of these can be used.

Next, the dielectric ceramic composition 20 constituting the dielectric layer 2 will be described with reference to FIG. 2.

Figure 2:
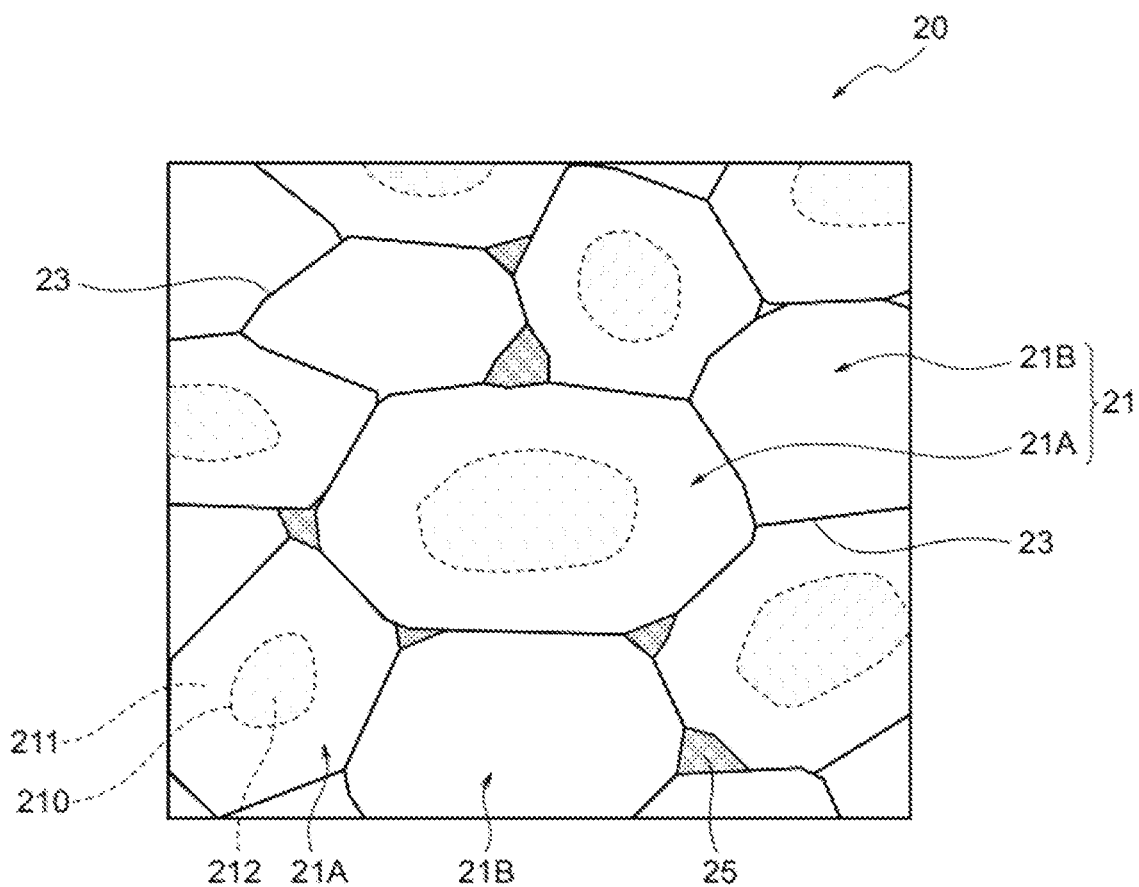
FIG. 2 is a schematic cross-sectional view illustrating a dielectric ceramic composition according to the embodiment of the present invention.

FIG. 2 is a cross-sectional view of a main part of the dielectric layer 2, that is, a cross-sectional view of the dielectric ceramic composition 20 according to the present embodiment. As illustrated in FIG. 2, the dielectric ceramic composition 20 according to the present embodiment contains dielectric particles 21 and grain boundaries 23, which are interfaces between the dielectric particles 21. In addition to the above, the dielectric ceramic composition 20 may contain segregation phases 25, voids (not shown), and the like.

The dielectric particles 21 are sintered particles, and an average diameter of the dielectric particles is preferably 0.05 μm to 2.0 μm, and more preferably 0.1 μm to 1.0 μm in terms of equivalent circle diameter. A particle size distribution of the dielectric particles 21 can be measured by observing at least three views of a cross section of the dielectric ceramic composition 20 (a cross section of the dielectric layer 2) with a scanning electron microscope (SEM) or a scanning transmission electron microscope (STEM), and analyzing images of the cross section captured during observation. Then, the average particle diameter in terms of equivalent circle diameter may be calculated based on the obtained particle size distribution.

The main component of the dielectric particle 21 contains a paraelectric material represented by a composition formula $(Ba_{1-x-y}Sr_xCa_y)_m(Ti_{1-z}Zr_z)O_3$. Here, in the present embodiment, the main component of the dielectric particle 21 means a component that occupies 50 mol % or more with respect to 100 mol % of the dielectric ceramic composition. In addition, the above composition formula can be simply expressed by a general formula $ABO_3$, and the paraelectric material having the above composition formula has a perovskite type crystal structure. In the above composition formula, an amount of oxygen (O) may deviate slightly from the above stoichiometric composition. In addition, symbols m, x, y, and z in the composition formula all represent composition molar ratios and satisfy the following conditions.

First, the symbol m in the above composition formula means a molar ratio of the A site (Ba, Sr, Ca) to the B site (Ti, Zr). In the present embodiment, $0.9 \leq m \leq 1.4$ is satisfied, and more preferably $0.98 \leq m \leq 1.05$ is satisfied. When m is less than 0.9, temperature dependence of an capacitance tends to increase, and when m is more than 1.4, an insulation resistance tends to decrease.

Next, the symbol x in the composition formula means a molar ratio of Sr at the A site, and the symbol y means a molar ratio of Ca at the A site. In the present embodiment, a sum $(x+y)$ of the molar ratio of Sr and the molar ratio of Ca satisfies $0.9 \leq (x+y) \leq 1.0$. That is, major elements at the A site are Sr and Ca, and Ba is an optional element at the A site. When a molar ratio of Ba at the A site exceeds 0.1, a relative permittivity tends to increase, but the insulation resistance tends to decrease.

In addition, the molar ratio x of Sr satisfies $0 \leq x < 1.0$, and the molar ratio y of Ca satisfies $0 < y \leq 1.0$. That is, Ca is an essential element at the A site, and a ratio of Sr to Ca is not limited. Preferably, $x < y$ is satisfied, and the temperature dependence of the capacitance can be reduced by making the molar ratio of Ca higher than that of Sr.

Meanwhile, regarding the B site, the symbol z represents a molar ratio of Zr at the B site, and satisfies $0.9 \leq z \leq 1.0$ in the present embodiment. That is, at the B site, Zr is an essential element, and Ti is an optional element. A molar ratio of Ti at the B site is preferably small, and more preferably $0.97 \leq z$ is satisfied. As the percentage of Zr at the B site increases, the temperature dependence of the capacitance can be reduced.

The dielectric ceramic composition 20 of the present embodiment may contain one or more subcomponents in addition to the above main component. For example, aluminum oxide ($Al_2O_3$), silicon oxide ($SiO_2$), a Mn compound, vanadium oxide ($V_2O_5$), an oxide containing at least one rare earth element, and an oxide containing at least one element of Nb, Mo, Ta, W, and Mg may be contained as the subcomponents.

The above subcomponents may be solid dissolved in the dielectric particles 21 containing the main component. Alternatively, the subcomponents may be present in the grain boundary 23, or may be partially concentrated in a part of the grain boundary 23 as the segregation phase 25. In the present embodiment, a presence form of the subcomponents is not limited. In addition, the segregation phase 25 may be present as a phase of a composite oxide when multiple elements constituting the subcomponents are combined together or some of the elements constituting the main component are combined with the subcomponents.

When $Al_2O_3$ is included in the subcomponents, a content of $Al_2O_3$ is preferably 0.1 to 0.5 parts by mol with respect to 100 parts by mol of the main component. When $SiO_2$ is included in the subcomponents, a content of $SiO_2$ is preferably 0.5 to 5.0 parts by mol with respect to 100 parts by mol of the main component. The sinterability of the dielectric ceramic composition 20 can be improved by containing $Al_2O_3$ or/and $SiO_2$ in the above ranges.

When the Mn compound is included in the subcomponents, a content of the Mn compound is preferably 0.01 to 3.0 parts by mol in terms of MnO with respect to 100 parts by mol of the main component. The sinterability of the dielectric ceramic composition 20 can be improved by containing the Mn compound in the above range.

When $V_2O_5$ is included in the subcomponents, a content of $V_2O_5$ is preferably 2.5 parts by mol or less with respect to 100 parts by mol of the main component. A highly accelerated life time can be improved by containing $V_2O_5$ in the above range.

In addition, when the oxide containing at least one rare earth element is included in the subcomponents, a content of such oxide is preferably 0.02 to 1.5 parts by mol with respect to 100 parts by mol of the main component. The rare earth elements include a total of 17 elements, which are Sc, Y, and lanthanoid elements. When the oxide containing at least one of Nb, Mo, Ta, W, and Mg is included in the subcomponents, a content of such oxide is preferably 0.02 to 1.5 parts by mol with respect to 100 parts by mol of the main component. When the oxide containing the rare earth element and the above oxide containing Nb or the like are included in the subcomponents in combination, a total content of these oxides is preferably 0.02 to 1.5 parts by mol with respect to 100 parts by mol of the main component. Including these oxides (having rare earth elements, Nb, etc.) in the above range can reduce the temperature coefficient of the capacitance and frequency dependence of dielectric loss tangent (tan δ).

A composition of the dielectric ceramic composition 20 can be identified by performing component analysis using electron probe micro analyzer (EPMA), X-Ray fluorescence analysis (XRF), inductively coupled plasma atomic emission spectroscopy (ICP), or the like. In the present embodiment, when the component analysis or the like is performed using EPMA, an energy dispersive spectrometer (EDS) or/and a wavelength dispersive spectrometer (WDS) may be used as an X-ray spectrometer.

As described above, in the present embodiment, the main component of the dielectric ceramic composition 20 is the paraelectric material satisfying a predetermined composition. In addition, the present embodiment is characterized in that the dielectric particles 21 of the dielectric ceramic composition 20 have a specific intragranular structure. That is, as illustrated in FIG. 2, the dielectric particles 21 include specific structural particles 21A each having two regions having different Ca concentrations.

More specifically, the specific structural particle 21A intragranularly includes a first region 211, and a second region 212 having a Ca concentration lower than that of the first region. In addition, the specific structural particle 21A intragranularly includes a concentration changing region 210 in which the Ca concentration changes dramatically between the first region 211 and the second region 212. In other words, the specific structural particle 21A has a core-shell structure based on a change in Ca concentration. The dielectric particle 21 may contain, in addition to the above specific structural particle 21A, a homogeneous solid solution particle 21B in which Ca is homogeneously solid dissolved.

In the present embodiment, the first region 211 is located on a surface side of the specific structural particle 21A and surrounds an outer surface of the second region 212. In each specific structural particle 21A, it is preferable that the first region 211 covers the entire second region 212, and it is preferable that the second region 212 is not in contact with the grain boundary 23. However, in the short axis (SA) direction of the specific structural particle 21A, there may be a portion where the first region 211 does not cover the second region 212. In this case, in a cross section of the specific structural particle 21A, a percentage (coverage ratio) of the first region 211 covering the second region 212 is preferably 95% or more.

Meanwhile, the second region 212 includes the particle center PC of the specific structural particle 21A, and is located on an intragranular center side of the specific structural particle 21A. In the present embodiment, the particle center PC means an intersection of the long axis LA and the short axis SA of the particle (21A).

The specific structural particle 21A intragranularly including the first region 211 and the second region 212 is characterized in that a Ca concentration ratio between the regions satisfies a predetermined condition. That is, when a Ca average concentration in the first region 211 is defined as C1 and a Ca average concentration in the second region 212 is defined as C2, C2/C1 is less than 0.8, preferably less than 0.7, and more preferably less than 0.5.

Figure 3A:
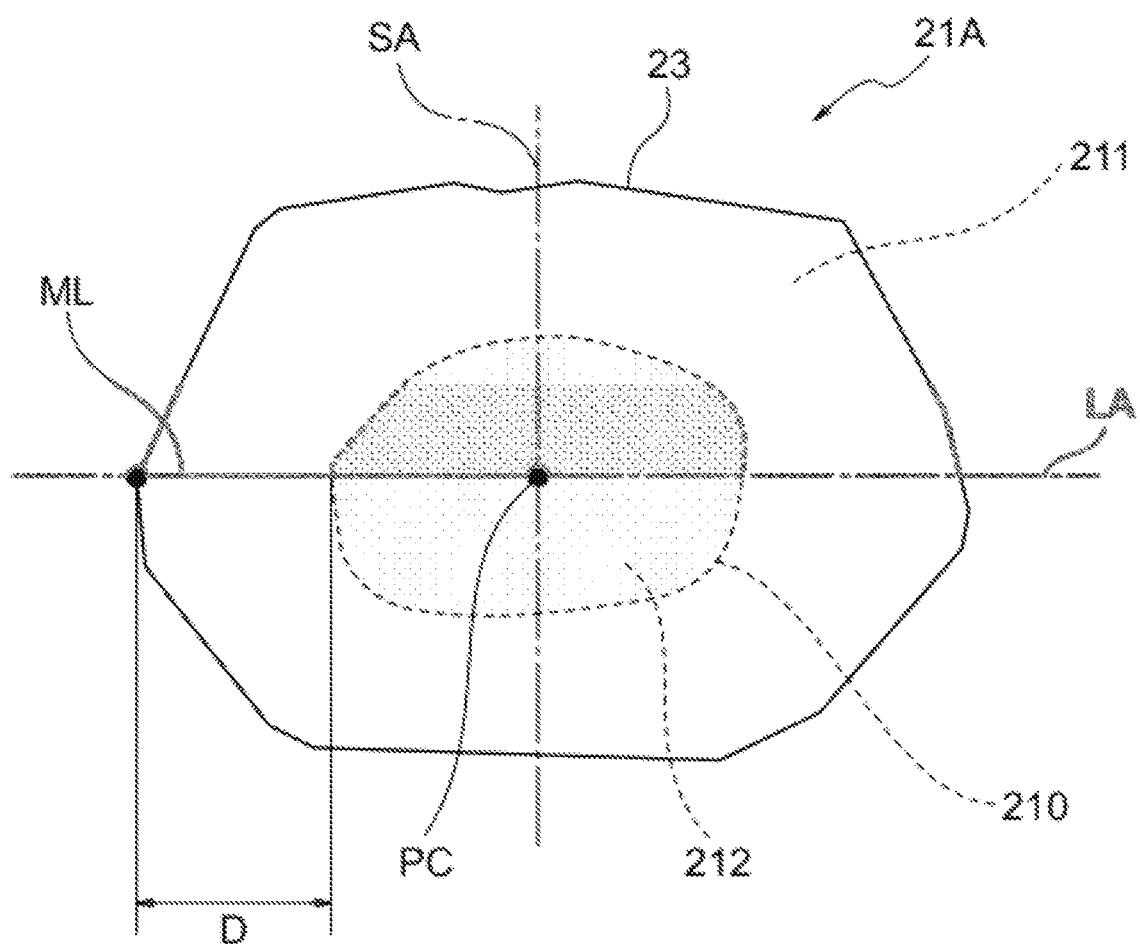
FIG. 3A is a schematic diagram illustrating a method for analyzing dielectric particles illustrated in FIG. 2.

In the present embodiment, these Ca average concentrations C1 and C2 are calculated by performing line analysis using EPMA. In the line analysis, in the cross section of the specific structural particle 21A as shown in FIG. 3A, a measurement line ML is drawn along the long axis LA of the specific structural particle 21A so that ML includes at least the range from the grain boundary 23 toward the particle center PC. Then, component analysis is performed at a regular interval along this measurement line ML to acquire continuous data representing a change in component concentration. A measurement interval in the line analysis is preferably 20 nm or less.

Figure 3B:
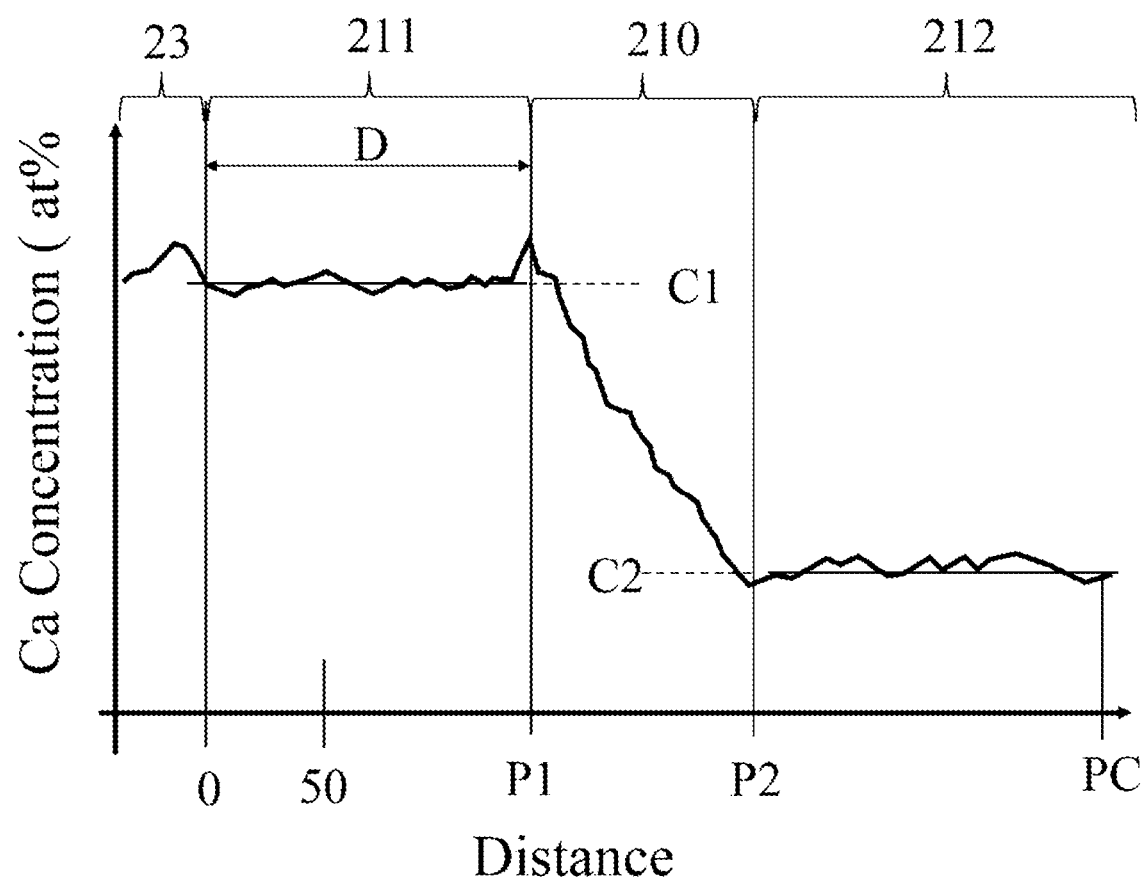
FIG. 3B is a graph illustrating a result of line analysis using STEM along a measurement line ML illustrated in FIG. 3A.

FIG. 3B is a graph illustrating an example of a line analysis result as described above. The vertical axis of the graph is the Ca concentration (at %), and the horizontal axis of the graph is the distance (nm) from the grain boundary. As illustrated in FIG. 3B, in the concentration changing region 210 of the specific structural particle 21A, a Ca concentration gradient is generated such that the Ca concentration continuously decreases from the first region 211 side toward the second region 212 side.

In FIG. 3B, a region from the grain boundary 23 to a point P1 corresponds to the first region 211, and the average concentration C1 is calculated based on the continuous data of the Ca concentration in this region. The point P1 is a starting point of the Ca concentration gradient, and is defined as a point where the Ca concentration starts to decrease continuously in the direction from the grain boundary 23 toward the particle center PC. Note that, the grain boundary 23 is visible in cross-sectional observations using tools such as SEM and STEM.

Meanwhile, in FIG. 3B, a region from a point P2 to the particle center PC corresponds to the second region 212, and the average concentration C2 is calculated based on the continuous data of the Ca concentration in this region. The point P2 is an end point of the Ca concentration gradient, and is defined as a point where the Ca concentration starts to increase continuously in the direction from the particle center PC toward a particle surface side.

A width D of the first region 211 along the long axis direction (LA) is 50 nm or longer, and more preferably 100 nm or more. The width D is a distance from the grain boundary 23 to the concentration changing region 210. That is, the concentration changing region 210 is present intragranularly at least 50 nm away from the grain boundary 23 along the long axis LA of the specific structural particle 21A. In addition, a width of the concentration changing region 210 along the long axis direction (LA) is preferably 50 nm to 400 nm, and more preferably 200 nm to 400 nm.

As illustrated in FIG. 3B, the Ca concentration may be maximum at an outer surface of the concentration changing region 210. It is assumed that Ca solid dissolves from a grain boundary 23 side toward the particle center PC, and that it is difficult for Ca to invade (solid dissolve) further from a certain depth. In addition, it is assumed that the Ca concentration gradient is generated from a point where Ca invasion becomes difficult (that is, the Ca concentration starts to decrease). The Ca element, which cannot invade a particle center side, is likely to be accumulated on the outer surface of the concentration changing region 210. As a result, it is assumed that the Ca concentration tends to be maximum at the boundary between the concentration changing region 210 and the first region 211.

In the present embodiment, it is preferable that an abundance ratio of the second region 212 satisfies a predetermined condition in the cross section of the dielectric ceramic composition 20.

That is, in the cross section of the dielectric ceramic composition 20 as illustrated in FIG. 2, when an area occupied by the first region 211 is defined as A1, an area occupied by the second region is defined as A2, and a sum of the area A1 and the area A2 is defined as A0, the ratio of A2 to A0 is preferably 0.05<A2/A0<0.6, more preferably 0.05<A2/A0<0.4, and still more preferably 0.1<A2/A0<0.4.

In addition, in the dielectric ceramic composition 20, it is preferable that the specific structural particles 21A are contained at a predetermined ratio. Specifically, in the dielectric ceramic composition 20, the ratio (number ratio) of the number of the specific structural particles 21A to the dielectric particles 21 is 20% or more, preferably 50% or more, and more preferably 80% or more. An upper limit of the number ratio is not limited, and the maximum achievable value of the number ratio is about 95%.

The number ratio of the specific structural particles 21A is calculated by identifying the specific structural particles 21A contained in a predetermined cross section in the line analysis as illustrated in FIGS. 3A and 3B. Specifically, the cross section of the dielectric ceramic composition 20 is observed using SEM or STEM, and the above line analysis is performed for all of the dielectric particles 21 contained in the cross section. Then, particles satisfying C2/C1<0.8 are identified as the specific structural particles 21A, and an abundance ratio of the identified specific structural particles 21A is calculated in terms of their number.

Meanwhile, the area ratio A2/A0 can be measured, for example, by surface analysis using EPMA and STEM. Specifically, Ca mapping data is acquired by observing the cross section in the same manner as the above line analysis and performing the surface analysis using EPMA and STEM during the observation. In the Ca mapping data, the second region 212 can be recognized as a region having a low Ca concentration, and the area A2 of the second region 212 can be obtained by measuring an area of this region by image analysis.

The area A1 of the first region 211 can be calculated by identifying the specific structural particles 21A contained in the observed cross section, measuring the area A0 of the specific structural particles 21A by image analysis, and then subtracting the area A2 of the second region 212 from the area A0. Therefore, the area ratio A2/A0 represents an area ratio of the second region to the area of the specific structural particles 21A.

In measurement of the number ratio or the area ratio A2/A0, it is preferable that each view to be observed has an area of 2 $\mu m^2$ to 20 $\mu m^2$. In addition, it is preferable that the number ratio or the area ratio A2/A0 are measured at 3 or more views, and are calculated as an average of the values measured at these views.

Next, an example of a method for manufacturing the multilayer ceramic capacitor 1 illustrated in FIG. 1 will be described. The multilayer ceramic capacitor 1 of the present embodiment can be manufactured by preparing a green chip with a printing method or a sheet method using a paste, firing the green chip, and then forming the pair of external electrodes 4 on the obtained element body 10.

First, raw materials of the main component constituting the dielectric ceramic composition 20 are prepared, and are weighed so as to have a desired composition ratio after firing. The raw materials used at this time may be an oxide powder containing elements constituting the main component, or a compound powder to be an oxide after firing (for example, a carbonate, a nitrate, an oxalate, a hydroxide, an organic metal compound). For example, a $BaCO_3$ powder, a $SrCO_3$ powder, a $CaCO_3$ powder, a $TiO_2$ powder, and a $ZrO_2$ powder can be used as the raw materials for the elements constituting the main component. In addition, the raw materials of the main component are preferably fine particles, and an average diameter of the fine particles is preferably 0.01 μm to 1.0 μm.

Next, the raw materials weighed above are wet-mixed using a mixer such as a ball mill, and the obtained mixed powder is dried and then calcined under a predetermined condition. In the present embodiment, in this mixing/calcining step, all the weighed raw materials other than the raw material of Ca are mixed. For the raw material of Ca, only a part of the powder weighed above is used. That is, a part of the raw material of Ca weighed according to a desired composition is mixed with other raw materials of the main component and calcined, while the rest is added after the raw materials of the main component are calcined. Therefore, a composition of the calcined powder obtained in the step is different from the desired main component composition and a main component composition finally obtained after firing. A percentage of the Ca raw material to be added later is preferably about 10 wt % to 50 wt % with respect to 100 wt % of the weighed Ca raw material.

Heat treatment conditions for calcining preferably include a retention temperature of 1100° C. to 1300° C. and a retention time of 1 to 4 hours. In addition, an atmosphere during the calcination is not limited, and may be air, an atmosphere of an inert gas such as nitrogen, or an atmosphere in a reduced pressure or vacuum state. By performing the heat treatment under the above conditions, the calcined powder of the main component can be obtained. It is preferable that the calcined powder is appropriately ground, pulverized, classified, etc. to adjust an average particle diameter of the calcined powder to about 0.1 μm to 1.0 μm.

Next, a dielectric raw material powder is obtained by adding the remaining Ca raw material and, if necessary, raw materials of subcomponents to the calcined powder obtained above and mixing them. As the raw materials of the subcomponents, an oxide powder or a compound powder to be an oxide after firing may be used as in the raw materials of the main component.

Then, the above dielectric raw material powder is added to an organic vehicle or an aqueous vehicle and kneaded to form paint, which is to be a dielectric paste. Here, the organic vehicle is the paint obtained by dissolving a binder in an organic solvent. The binder used for the organic vehicle is not limited. For example, various binders, such as ethyl cellulose and polyvinyl butyral, can be used. The organic solvent used for the organic vehicle is also not limited. For example, various organic solvents, such as terpineol, butyl carbitol, acetone, and toluene, can be used. Meanwhile, the aqueous vehicle is paint obtained by dissolving a water-soluble binder in water. In this case, the water-soluble binder is not limited, and may be polyvinyl alcohol, cellulose, a water-soluble acrylic resin, or the like for example. In addition to the above binders and solvents, the dielectric paste may contain other additives such as a plasticizer, a dispersant, and the like.

In addition to the above dielectric paste, an internal electrode paste that constitutes the internal electrode layer 3 after firing is also prepared. The internal electrode paste may be prepared by kneading the above organic vehicle and the above conductive material made of Ni or the Ni-based alloy, or various oxides, organic metal compounds, resinates or the like to be the above Ni or Ni-based alloy after firing. When kneading, a ceramic component (preferably the same composition as the main component) contained in the dielectric paste may be added as a co-material to the internal electrode paste.

In each of the above pastes (the dielectric paste and the internal electrode paste), a blending ratio of a vehicle is not limited, and a known blending ratio may be adopted. For example, a content of the binder may be about 1 to 10 parts by weight, and a content of the solvent may be about 10 to 100 parts by weight with respect to 100 parts by weight of the dielectric raw material powder.

Next, the green chip that becomes the element body 10 after firing is manufactured using each of the above pastes. The green chip can be manufactured with any printing methods or any sheet methods.

For example, in the case of manufacturing the green chip with the sheet method, a green sheet is obtained by applying the dielectric paste onto a carrier film made of PET or the like to form a sheet, and appropriately drying it. Then, the internal electrode paste is applied onto the green sheet in a predetermined pattern using any printing methods, such as screen printing. A plurality of such green sheet is laminated to form layers, and then pressed in a laminating direction, so as to obtain a mother laminated body. At this time, the green sheets are laminated such that only dielectric layers are located on the top surface and the bottom surface of the mother laminated body in the laminating direction. Then, the mother laminated body obtained through the above step is cut by dicing or push-cutting to obtain a plurality of green chips.

Next, these green chips are subjected to a binder removal treatment. Conditions for the binder removal treatment are such that a heating rate is preferably 5° C./h to 300° C./h, a retention temperature is preferably 180° C. to 900° C., and a temperature retention time is preferably 0.5 to 48 hours. The atmosphere of the binder removal treatment is air or a reducing atmosphere.

After the binder removal treatment, the green chips are subjected to firing (main firing). In the present embodiment, in order to control the intragranular structure of the dielectric particle 21 to have a desired state, a part of the Ca raw material is added later as described above, and an oxygen partial pressure during firing and a heating rate are controlled within appropriate ranges.

Specifically, an atmosphere during firing is preferably a reducing atmosphere, and an atmosphere gas is preferably, for example, a humidified mixture gas of nitrogen ($N_2$) and hydrogen ($H_2$). The oxygen partial pressure during firing is $1.0 \times 10^{-12}$ MPa or more, preferably $2.0 \times 10^{-12}$ MPa or more, more preferably $1.0 \times 10^{-11}$ MPa or more, and still more preferably $2.0 \times 10^{-10}$ MPa or more. As the oxygen partial pressure during firing increases, the difference between the Ca concentrations of the first region 211 and the second region 212 tends to increase, and C2/C1 tends to decrease. The upper limit of the oxygen partial pressure is preferably $1.0 \times 10^{-9}$ MPa.

The heating rate during firing is preferably set as low as 100° C./h or less, and more preferably within a range of 5° C./h to 50° C./h. By lowering the heating rate, the later-added Ca is more likely to solid dissolve in the dielectric particles 21, and the ratio (A2/A0) of the area A2 of the second region 212 tends to decrease. In addition, as the heating rate is lowered, the number ratio of the specific structural particles 21A tends to increase.

In addition, when the heating rate is lowered, the Ca concentration gradient (the concentration changing region 210) is likely to be intragranularly formed at a position farther from the grain boundary 23 in the specific structural particle 21A (that is, the width D illustrated in FIG. 3B extends). A retention temperature during firing is preferably 1100° C. to 1300° C., and more preferably 1150° C. to 1200° C. A retention time during firing is preferably 0.2 hours to 3 hours, and more preferably 0.5 hours to 2 hours. In a cooling process after temperature retention, a cooling rate is preferably 50° C./h to 300° C./h.

The element body 10 can be obtained by firing under the above conditions. In the present embodiment, it is preferable to perform an annealing treatment (an oxidation treatment on the dielectric layers) on the element body 10 after firing. In the oxidation treatment, a retention temperature is preferably 1150° C. or lower, and more preferably 500° C. to 1100° C. A temperature retention time during the oxidation treatment may be 0 to 20 hours, and is preferably 6 to 10 hours. An atmosphere during the oxidation treatment is preferably a nitrogen atmosphere or a humidified nitrogen atmosphere, and an oxygen partial pressure is preferably $1.0 \times 10^{-9}$ to $1.0 \times 10^{-5}$ MPa.

The binder removal treatment, the firing, and the oxidation treatment may be performed continuously or independently. These heat treatment steps (the binder removal treatment, the firing, and the oxidation treatment) may be performed on the mother laminated body before cutting, and the mother laminated body may be cut after the heat treatment steps to obtain a plurality of element bodies 10. These obtained element bodies 10 may be appropriately subjected to an end surface treatment, such as polishing or blasting.

Finally, the pair of external electrodes 4 are formed at the ends of the element body 10 obtained using the above manufacturing method. A method for forming the external electrodes 4 is not limited. For example, the external electrodes 4 may be formed by baking a conductive paste containing glass frit or the like. Alternatively, the external electrodes 4 may be formed as resin electrodes by applying a conductive paste containing a thermosetting resin and curing the resin by heating. The external electrodes 4 may also be formed using film formation methods, such as plating or sputtering. The external electrodes 4 may be laminated electrodes formed by forming a single or a plurality of plating layers on a surface of the baked electrode or the resin electrode. For example, the external electrodes 4 can have a laminated structure including Cu baked electrode/Ag—Pd resin electrode/Ni plating/Sn plating, in which case the base electrode in contact with the element body 10 is the Cu baked electrode.

The multilayer ceramic capacitor 1 of the present embodiment manufactured using the above method is to be mounted on a substrate such as a circuit board using a solder or a conductive adhesive, and is to be used in various electronic devices and the like.

Summary of Embodiment

In the dielectric ceramic composition 20 of the present embodiment, the main component of the dielectric particle 21 includes a paraelectric material represented by a composition formula $(Ba_{1-x-y}Sr_xCa_y)_m(Ti_{1-z}Zr_z)O_3$, and $0.9 \leq m \leq 1.4$, $0 \leq x < 1.0$, $0 < y \leq 1.0$, $0.9 \leq (x+y) \leq 1.0$, and $0.9 \leq z \leq 1.0$ are satisfied in the composition formula. The dielectric particle 21 contains the specific structural particles 21A including two regions (the first region 211 and the second region 212) having different Ca concentrations from each other, and the Ca concentration ratio C2/C1 between the regions in the specific structural particle 21A is less than 0.8.

In the dielectric ceramic composition 20 of the present embodiment, as described above, the main component composition and the intragranular structure are controlled under predetermined conditions, whereby temperature characteristics and insulation characteristics of the dielectric ceramic composition 20 can be improved at the same time.

A conventional paraelectric material typically contains complete solid solution particles having a uniform component concentration, and improvements in temperature characteristics (a decrease in temperature coefficient of capacitance) have been made by adjusting a composition of the complete solid solution particles (for example, the above Patent Document 1). However, the temperature characteristics and the insulation characteristics are in a contradictory relation, and the insulation characteristics tend to decrease when the temperature characteristics improve.

In the dielectric ceramic composition 20 of the present embodiment, a region (the first region 211) having a locally high Ca concentration is formed intragranularly, and the region having a high Ca concentration enhances insulating properties among the dielectric particles 21. As a result, both a low temperature coefficient of capacitance and a high insulation resistance can be achieved at the same time. In particular, setting the area ratio A2/A0 related to the first region 211 and the second region 212 to a predetermined range can further improve the temperature characteristics and the insulation characteristics. In addition, increasing the number ratio of the specific structural particles 21A to the dielectric particles 21 (preferably 50% or more, more preferably 80% or more) can further improve the temperature characteristics and the insulation characteristics.

Typically, in a multilayer ceramic capacitor, the temperature characteristics and the insulation characteristics tend to decrease as a thickness of a dielectric layer decreases. In the multilayer ceramic capacitor 1 of the present embodiment, using the dielectric ceramic composition 20 having the above predetermined characteristics enables both a low temperature coefficient of capacitance and a high insulation resistance to be achieved at the same time even when a thickness of the dielectric layer 2 is reduced to 2 μm or less. Therefore, the multilayer ceramic capacitor 1 of the present embodiment can be suitably used to achieve the COG characteristics, and can be suitably used for temperature compensation, high frequency circuits, and other usage.

Although the embodiment of the present disclosure has been described above, the present invention is not limited to the above embodiment, and various modifications can be made without departing from the gist of the present invention.

While the electronic component according to the present embodiment is described as the multilayer ceramic capacitor in the above embodiment, the electronic component according to the present invention is not limited to the multilayer ceramic capacitor as long as the dielectric ceramic composition 20 is contained. For example, the electronic component according to the present disclosure may be a single plate ceramic capacitor, or may be a filter, a composite element such as an LC circuit element, a varistor, or the like.

EXAMPLES

Hereinafter, the present disclosure will be described based on more detailed examples. However, the present invention is not limited to the following examples. Samples marked with * in Tables 2 and 4 are outside the scope of the present invention.

Experiment 1

In Experiment 1, multilayer ceramic capacitor samples according to Samples 1 to 20 were prepared using a procedure shown below.

First, in order to prepare a calcined powder of a dielectric raw material, a $BaCO_3$ powder, a $SrCO_3$ powder, a $CaCO_3$ powder, a $TiO_2$ powder, and a $ZrO_2$ powder were prepared as raw materials, and weighed so as to obtain a desired composition ratio. At this time, the average particle diameter of the prepared raw materials was 0.1 μm to 1.5 μm.

Next, the weighed raw materials were wet-mixed in a ball mill for 20 hours and appropriately dried to obtain a mixture of the raw materials. In this mixing step, a total amount of the weighed $CaCO_3$ powder was added in Samples 9 and 13, while only a part of the weighed $CaCO_3$ powder was added in other Samples (1 to 8, 10 to 12, and 14 to 20), in which the remaining $CaCO_3$ powder was added later after a calcination step described later.

Next, the mixture of the raw materials obtained above was calcined at 1250° C. for 2 hours to obtain a calcined powder of the raw materials. After the above heat treatment, the calcined powder was wet-pulverized using a ball mill and then dried.

Then, the remaining $CaCO_3$ powder and the raw materials of subcomponents were added to and mixed with the above calcined powder to obtain a dielectric raw material powder. At this time, as the subcomponents, 0.3 parts by mol of $Al_2O_3$, 2.0 parts by mol of $SiO_2$, and 2.0 parts by mol of $MnCO_3$ were added to 100 parts by mol of the main component. In Samples 1 to 8, 10 to 12, and 14 to 20, a percentage of the later-added Ca raw material (the $CaCO_3$ powder) was set to 20 wt % with respect to 100 wt % of the weighed Ca raw material (that is, the Ca raw material required to achieve a desired main component composition). Then, the dielectric raw material powder was dried and kneaded together with a predetermined organic vehicle to form paint to obtain a dielectric paste.

Meanwhile, an internal electrode paste was obtained by kneading 100 parts by weight of a Ni powder, 40 parts by weight of a predetermined organic vehicle, and 10 parts by weight of butyl carbitol with a triple roll mill and forming paint.

Next, the prepared dielectric paste was applied onto a PET film to form a sheet to obtain a green sheet. Further, the internal electrode paste was printed on the green sheet in a predetermined pattern, and the green sheet was peeled off from the PET film. Then, a plurality of green sheets on which an internal electrode pattern was printed were laminated and adhered by pressure to obtain a green laminated body. Protective layer green sheets on which an internal electrode pattern was not printed were laminated on the top surface and the bottom surface in the laminating direction of the green laminated body.

Next, the green laminated body was cut to a predetermined size to obtain green chips, and these green chips were subjected to a binder removal treatment, firing, and a reoxidation treatment. Detailed conditions for each of these heat treatment steps were as follows.

As for the conditions for the binder removal treatment, the heating rate was 30° C./h, the retention temperature was 260° C., the temperature retention time was 8 hours, and the atmosphere was air.

As for the conditions for firing, the retention temperature was 1250° C., the temperature retention time was 2 hours, the cooling rate was 300° C./h or more, and the atmosphere was a humidified $N_2+H_2$ mixed gas. In addition, the heating rate and the oxygen partial pressure during firing were set to values shown in Table 1.

As for the conditions for the annealing treatment (the reoxidation treatment), the retention temperature was 750° C., the retention time was 2 hours, the atmosphere was a humidified $N_2$ gas, and the oxygen partial pressure was $1.0 \times 10^{-9}$ MPa or more. In the firing and the annealing treatment, a wetter was used for humidifying the atmosphere gases.

An element body 10 was obtained by performing heat treatments under the above conditions. Next, the end surfaces of the obtained element body 10 were polished by sandblasting, and then In—Ga eutectic alloys were applied as external electrodes to obtain a capacitor sample having a shape same as that of the multilayer ceramic capacitor 1 illustrated in FIG. 1. The size of the obtained capacitor sample (the size of the element body 10) was 3.2 mm×1.6 mm×0.6 mm. The average thickness of the dielectric layers 2 was 1.5 µm. The average thickness of the internal electrode layers 3 was 1.0 µm. The number of the dielectric layers 2 sandwiched between the internal electrode layers 3 was five.

In addition, a cross-sectional observation for each of the capacitor samples of Samples 1 to 20 was performed using STEM to measure the number ratio of the specific structural particles 21 and the average concentration ratio C2/C1 between regions. The measurement was carried out using line analysis with STEM. C2/C1 represents the average value of the measurement results for 10 specific structural particles 21A. The number ratio represents the average value of the measurement results for 5 views, and the area of each measured view was 5 µm². Detailed conditions of the measurement were as described in the description of the embodiment. Table 2 shows the measurement results for each Samples. Main component compositions shown in Table 2 are the results of component analysis of the dielectric layers 2 using ICP.

Additionally, in Experiment 1, the following characteristic evaluations were carried out for each capacitor sample obtained above.

Relative Permittivity ε

First, the relative permittivity ε of each capacitor sample was measured. The relative permittivity ε was calculated by measuring the capacitance using an LCR meter (4274A manufactured by YHP). Specifically, in the measurement of the capacitance, a measurement temperature was set to 25° C., and a signal with a frequency of 1 kHz and an input signal level (measurement voltage) of 1 Vrms was input to the capacitor sample. Then, the relative permittivity (without unit) was calculated based on the thickness of the dielectric layer, an effective electrode area, and the measured capacitance. The above measurement was carried out for 10 samples for each Sample to calculate an average value.

Insulation Resistance LogIR

In addition, the insulation resistance LogIR (unit: Ω) of each of the capacitor samples in a high temperature environment was measured. Specifically, a DC voltage of 100 V/µm was applied to the capacitor sample for 10 minutes at a temperature of 125° C., and then the insulation resistance after 10 minutes was measured using an insulation resistance tester (R8340A manufactured by Advantest). The measurement was carried out for 10 samples for each Sample to calculate the average insulation resistance of each Sample. For the insulation resistance LogIR, the pass/fail criterion is 13Ω, and 14Ω or more is determined to be good.

Temperature Coefficient of Capacitance τC

Further, the temperature coefficient of capacitance τC (unit: ppm/° C.) of each Samples was measured. Specifically, a signal with a frequency of 1 kHz and an input signal level (measurement voltage) of 1 Vrms was input to the capacitor sample at temperatures of 25° C. and 125° C. to measure the capacitance at each temperature. Then, the temperature coefficient of capacitance was calculated using the following equation based on the capacitance C25 at 25° C. and the capacitance C125 at 125° C.

$$\tau C = \{(C125-C25)/C25\} \times (1/(125-25))$$

The above measurement was carried out for 10 samples for each Sample to calculate the average temperature coefficient of each Sample. The temperature coefficient of capacitance is determined to meet a criterion when the temperature coefficient of capacitance is within a range of ±30 ppm/° C., and is determined to be particularly good when the temperature coefficient of capacitance is within a range of ±20 ppm/° C.

Table 2 shows evaluation results for each Sample in Experiment 1.

TABLE 1

| Sample No. | Percentage of later-added Ca raw material wt % | Oxygen concentration during firing MPa | Heating rate during firing ° C./h |
|---|---|---|---|
| 1 to 8, 10 to 12, 16 | 20 | $2.9 \times 10^{-12}$ | 50 |
| 9, 13 | 0 | $1.8 \times 10^{-13}$ | 50 |
| 14 | 20 | $1.8 \times 10^{-13}$ | 50 |
| 15 | 20 | $7.2 \times 10^{-13}$ | 50 |
| 17 | 20 | $1.2 \times 10^{-11}$ | 50 |
| 18 | 20 | $2.9 \times 10^{-10}$ | 50 |
| 19 | 20 | $2.9 \times 10^{-12}$ | 20 |
| 20 | 20 | $2.9 \times 10^{-12}$ | 5 |

TABLE 2

| | Main component composition: $(Ba_{1-x-y}Sr_xCa_y)_m(T_{1-z}Zr_z)O_3$ | | | | | Specific structural particle | | Evaluation result | | |
|---|---|---|---|---|---|---|---|---|---|---|
| Sample No. | m Molar ratio | x Molar ratio | y Molar ratio | x + y Molar ratio | z Molar ratio | Concentration ratio: C2/C1 — | Number ratio % | Relative permittivity ε — | Insulation resistance: LogIR Ω | Temperature coefficient of capacitance: τC ppm/° C. |
| *1 | 0.89 | 0.35 | 0.65 | 1.00 | 1.00 | 0.74 | 40 | 46 | 13.2 | 39 |
| 2 | 0.90 | 0.30 | 0.70 | 1.00 | 0.97 | 0.73 | 38 | 37 | 13.1 | 28 |
| 3 | 1.40 | 0.35 | 0.65 | 1.00 | 1.00 | 0.75 | 33 | 22 | 13.0 | 15 |
| *4 | 1.41 | 0.30 | 0.70 | 1.00 | 0.99 | 0.75 | 31 | 19 | 11.9 | 12 |
| *5 | 1.00 | 0.30 | 0.55 | 0.85 | 1.00 | 0.72 | 32 | 35 | 12.2 | 22 |
| 6 | 1.05 | 0.35 | 0.65 | 1.00 | 0.99 | 0.74 | 32 | 34 | 13.3 | 23 |
| 7 | 1.03 | 0.00 | 1.00 | 1.00 | 0.99 | 0.73 | 36 | 33 | 14.5 | 12 |
| 8 | 1.05 | 0.90 | 0.10 | 1.00 | 1.00 | 0.71 | 32 | 33 | 13.3 | 29 |
| *9 | 1.00 | 0.20 | 0.01 | 0.21 | 0.50 | 0.99 | 0 | 550 | 10.5 | −810 |
| *10 | 0.98 | 0.30 | 0.70 | 1.00 | 0.85 | 0.74 | 31 | 70 | 11.4 | 47 |
| 11 | 0.98 | 0.35 | 0.65 | 1.00 | 0.90 | 0.76 | 35 | 33 | 13.0 | 28 |
| 12 | 0.98 | 0.30 | 0.70 | 1.00 | 1.00 | 0.76 | 38 | 33 | 13.5 | 24 |
| *13 | 1.01 | 0.30 | 0.70 | 1.00 | 0.97 | 0.99 | 0 | 32 | 11.9 | 28 |
| *14 | 0.98 | 0.35 | 0.65 | 1.00 | 0.99 | 0.87 | 0 | 34 | 12.3 | 28 |
| *15 | 1.00 | 0.30 | 0.70 | 1.00 | 0.99 | 0.83 | 0 | 35 | 12.6 | 28 |
| 16 | 1.00 | 0.30 | 0.70 | 1.00 | 1.00 | 0.79 | 36 | 35 | 13.1 | 29 |
| 17 | 1.00 | 0.35 | 0.65 | 1.00 | 1.00 | 0.68 | 46 | 35 | 13.8 | 28 |
| 18 | 1.00 | 0.30 | 0.70 | 1.00 | 1.00 | 0.49 | 49 | 33 | 14.2 | 27 |
| 19 | 1.00 | 0.30 | 0.70 | 1.00 | 1.00 | 0.77 | 54 | 34 | 14.7 | 20 |
| 20 | 1.00 | 0.30 | 0.70 | 1.00 | 1.00 | 0.79 | 82 | 34 | 15.0 | 15 |

From the results shown in Table 2, it is confirmed that a high insulation resistance (13Ω or more) and a low temperature coefficient of capacitance (within the range of ±30 ppm/° C.) are achieved when the main component satisfies a predetermined composition ratio and the dielectric layer 2 contains the specific structural particles 21A satisfying C2/C1<0.8. Although not shown in Table 2, it is confirmed that, in the samples satisfying C2/C1<0.8, the width D of the first region 211 in the long axis direction was 50 nm or more.

Figure 4:
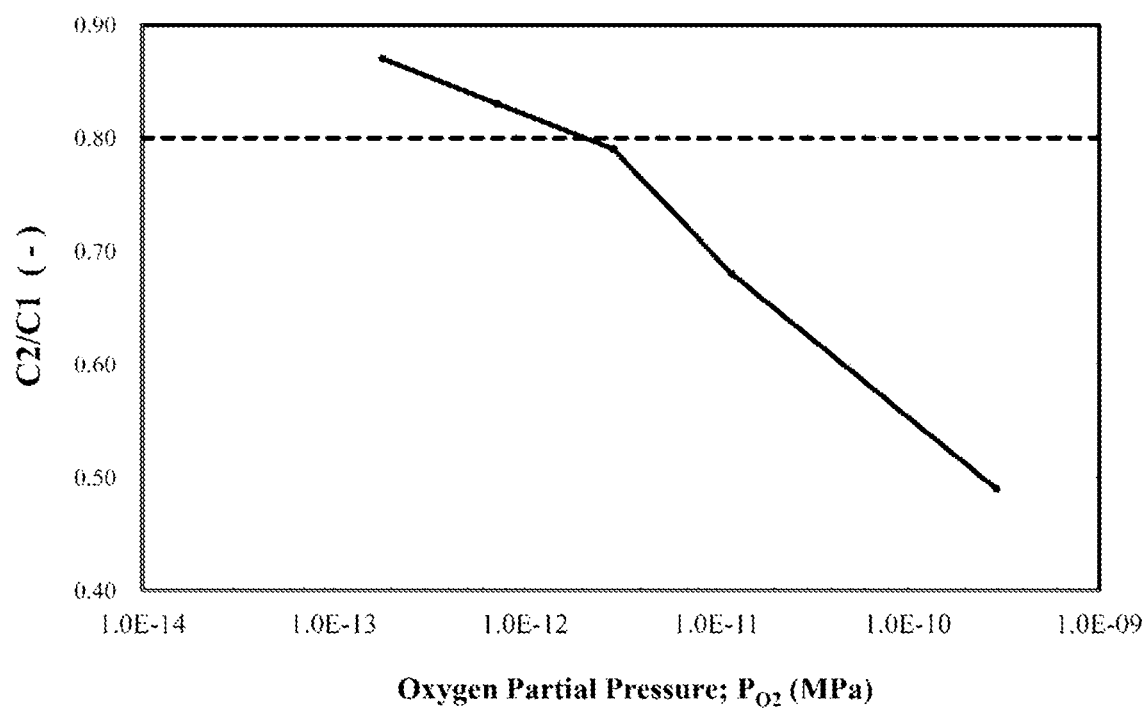
FIG. 4 is a graph illustrating a relation between an oxygen partial pressure during firing and a Ca concentration ratio C2/C1.
Figure 5:
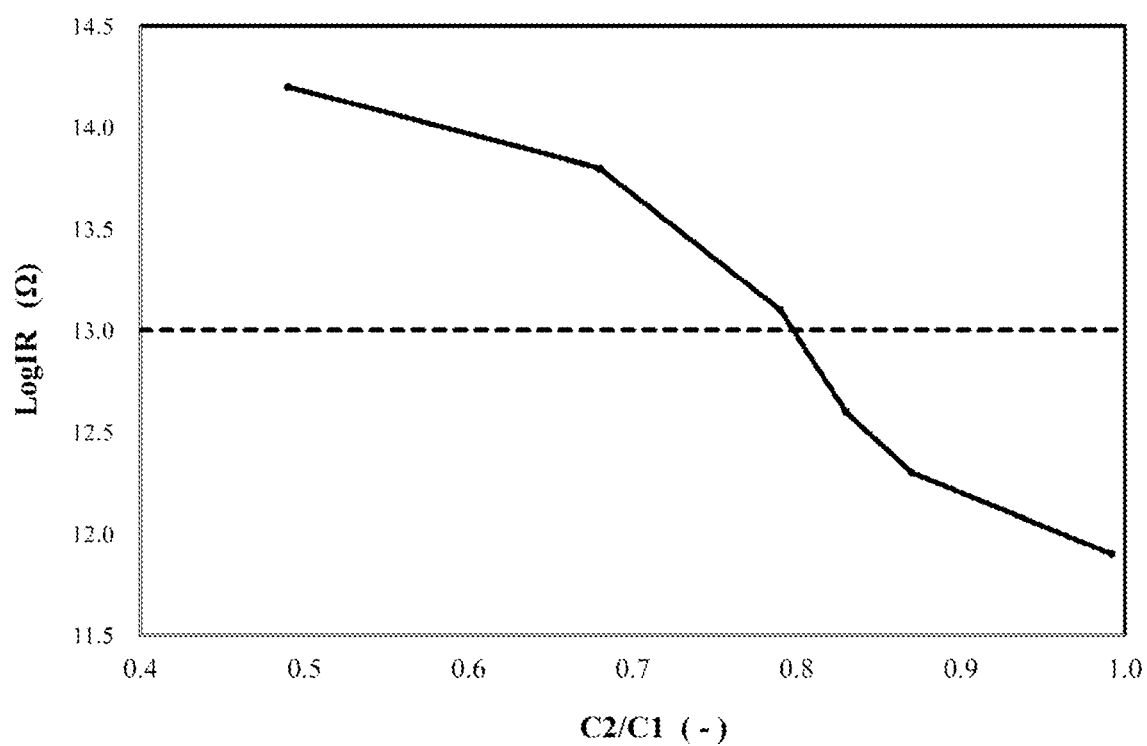
FIG. 5 is a graph illustrating a relation between the Ca concentration ratio C2/C1 and an insulation resistance.

FIGS. 4 and 5 sum up the results in Tables 1 and 2. Specifically, in FIG. 4, the vertical axis represents the average concentration ratio C2/C1 between the regions, and the horizontal axis represents the oxygen partial pressure during firing. As shown in FIG. 4, it is found that, as the oxygen partial pressure during firing increases, C2/C1 decreases. In addition, although not shown as a graph, from the results of Samples 19 and 20 in Tables 1 and 2, it is found that, as the heating rate during firing lowers, the number ratio of the specific structural particles 21A to the dielectric particles 21 increases.

Meanwhile, in FIG. 5, the vertical axis represents the insulation resistance LogIR and the horizontal axis represents C2/C1. As shown in FIG. 5, it is found that, as the average concentration ratio C2/C1 between the regions increases, the insulation resistance increases.

As described above, from the results of Experiment 1, it is confirmed that both insulation characteristics and temperature characteristics can be improved at the same time by controlling the main component composition and the intragranular C2/C1 under predetermined conditions.

Experiment 2

In Experiment 2, capacitor samples (multilayer ceramic capacitors) according to Samples 21 to 28 were manufactured under experimental conditions shown in Table 3. Specifically, Experiment 2 was carried out with the heating rate changed, so as to obtain Samples 21 to 28 having different area ratios A2/A0. In Experiment 2, experimental conditions other than the conditions shown in Table 3 were the same as those for Experiment 1, and the obtained capacitor samples were evaluated using the same methods as in Experiment 1. Table 4 shows the evaluation results.

The area ratios A2/A0 shown in Table 4 were measured by surface analysis of a cross section of the dielectric layer 2 using STEM. In the measurement, A2/A0 was calculated as an average value of measurement of 5 views, and the area of each view was 5 μm².

TABLE 3

| Sample No. | Percentage of later-added Ca starting material wt % | Oxygen concentration during firing MPa | Heating rate during firing ° C./h |
|---|---|---|---|
| 21 | 20 | $2.9 \times 10^{-12}$ | 10 |
| 22 | 20 | $2.9 \times 10^{-12}$ | 20 |
| 23 | 20 | $2.9 \times 10^{-12}$ | 40 |
| 24 | 20 | $2.9 \times 10^{-12}$ | 50 |
| 25 | 20 | $2.9 \times 10^{-12}$ | 70 |
| 26 | 20 | $2.9 \times 10^{-12}$ | 80 |
| 27 | 20 | $2.9 \times 10^{-12}$ | 100 |
| 28 | 20 | $2.9 \times 10^{-12}$ | 150 |

TABLE 4

| | Main component composition: $(Ba_{1-x-y}Sr_xCa_y)_m(Ti_{1-z}Zr_z)O_3$ | | | | | Specific structural particle | | Evaluation result | | |
|---|---|---|---|---|---|---|---|---|---|---|
| Sample No. | m Molar ratio | x Molar ratio | y Molar ratio | x + y Molar ratio | z Molar ratio | Concentration ratio: $C_\beta/C_\alpha$ | Area ratio: A2/A0 | Relative permittivity ε | Insulation resistance: LogIR Ω | Temperature coefficient of capacitance: τC ppm/° C. |
| *21 | 1.00 | 0.35 | 0.65 | 1.00 | 0.99 | 0.83 | 0.05 | 40 | 13.8 | 35 |
| 22 | 1.00 | 0.30 | 0.70 | 1.00 | 0.99 | 0.79 | 0.06 | 38 | 13.8 | 29 |
| 23 | 1.00 | 0.30 | 0.70 | 1.00 | 1.00 | 0.77 | 0.11 | 35 | 13.9 | 24 |
| 24 | 0.99 | 0.35 | 0.65 | 1.00 | 1.00 | 0.75 | 0.20 | 35 | 13.7 | 23 |
| 25 | 0.99 | 0.30 | 0.70 | 1.00 | 1.00 | 0.75 | 0.30 | 33 | 13.7 | 22 |
| 26 | 1.00 | 0.30 | 0.70 | 1.00 | 1.00 | 0.75 | 0.39 | 35 | 13.5 | 22 |
| 27 | 1.00 | 0.35 | 0.65 | 1.00 | 1.00 | 0.77 | 0.59 | 35 | 13.0 | 22 |
| *28 | 1.00 | 0.30 | 0.70 | 1.00 | 1.00 | 0.81 | 0.62 | 33 | 12.5 | 21 |

From the results shown in Tables 3 and 4, it is confirmed that, as the heating rate during firing decreases, the later-added Ca component is likely to be solid dissolved in dielectric particles, and the area ratio A2/A0 tends to decrease (that is, the ratio of the second region 212 tends to decrease). In addition, it is confirmed that, when the area ratio A2/A0 satisfies 0.05<A2/A0<0.6, both temperature characteristics and insulation characteristics can be improved at the same time. Further, it is confirmed that, when A2/A0 is more than 0.1, the temperature coefficient of capacitance is particularly improved, and when the area ratio A2/A0 is less than 0.4, the insulation characteristics are particularly improved.

DESCRIPTION OF THE REFERENCE NUMERALS 1 multilayer ceramic capacitor
10 element body
2 dielectric layer
20 dielectric ceramic composition
21 dielectric particle
21A specific structural particle
210 concentration changing region
211 first region
212 second region
21B homogeneous solid solution particle
23 grain boundary
25 segregation phase
3 internal electrode layer
4 external electrode

What is claimed is:

1. A dielectric ceramic composition, comprising:
dielectric particles containing a main component represented by a composition formula $(Ba_{1-x-y}Sr_xCa_y)_m(Ti_{1-z}Zr_z)O_3$; and
grain boundaries present between the dielectric particles, wherein
m, x, y, and z in the composition formula are all molar ratios,
$0.9 \leq m \leq 1.4$, $0 \leq x < 1.0$, $0 < y \leq 1.0$, $0.9 \leq (x+y) \leq 1.0$, and $0.9 \leq z \leq 1.0$ are satisfied in the composition formula,
the dielectric particles contain specific structural particles having a predetermined intragranular structure, and each of the specific structural particles intragranularly includes a first region and a second region having different Ca concentrations from each other, and
C2/C1 is less than 0.8 in which C1 is an average value of the Ca concentration in the first region and C2 is an average value of the Ca concentration in the second region.

2. The dielectric ceramic composition according to claim 1, wherein
the second region includes a particle center of the specific structural particle, and
the first region surrounds the second region.

3. The dielectric ceramic composition according to claim 1, wherein
C2/C1 is less than 0.7.

4. The dielectric ceramic composition according to claim 1, wherein
C2/C1 is less than 0.5.

5. The dielectric ceramic composition according to claim 1, wherein
an area occupied by the first region is A1, an area occupied by the second region is A2, a sum of A1 and A2 is A0, and A2/A0 is greater than 0.05 and less than 0.6, in a cross section of the dielectric ceramic composition.

6. The dielectric ceramic composition according to claim 5, wherein
A2/A0 is less than 0.4.

7. The dielectric ceramic composition according to claim 5, wherein
A2/A0 is greater than 0.1 and less than 0.4.

8. The dielectric ceramic composition according to claim 1, wherein
a number ratio of the specific structural particles to the dielectric particles is 50% or more.

9. The dielectric ceramic composition according to claim 1, wherein
a number ratio of the specific structural particles to the dielectric particles is 80% or more.

10. An electronic component, comprising:
the dielectric ceramic composition according to claim 1.

* * * * *